March 22, 1966  C. A. MORENO ETAL  3,242,496
SCANNING ANTENNA SYSTEM
Filed Aug. 6, 1948  3 Sheets-Sheet 1
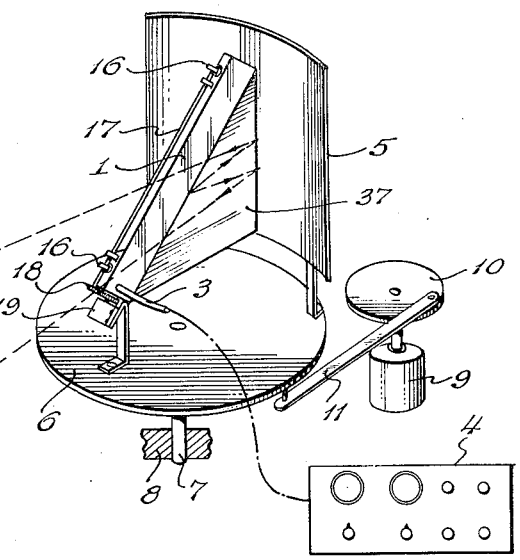
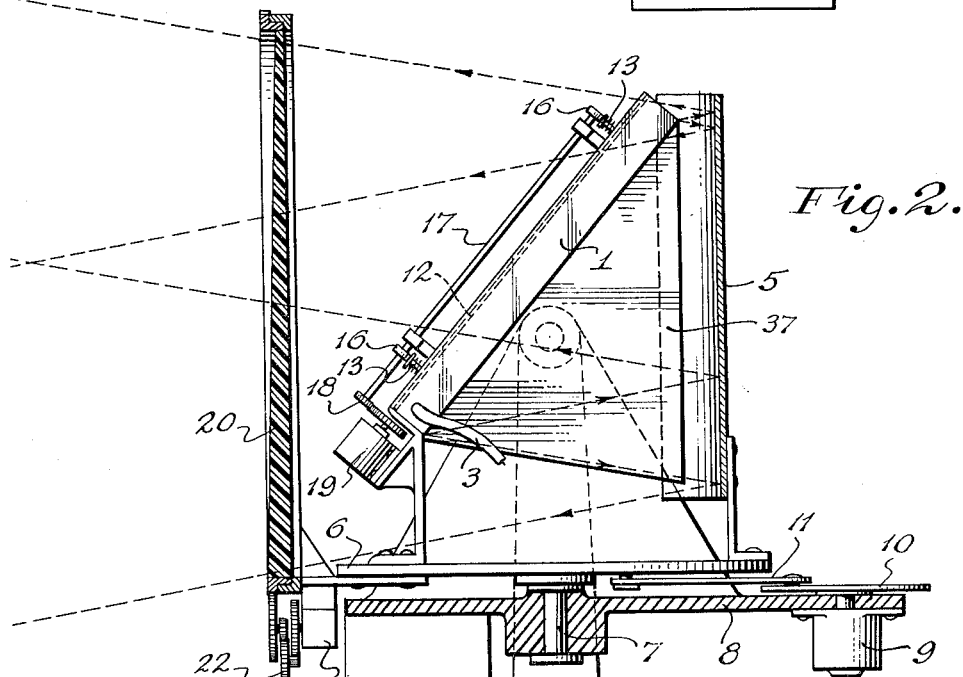
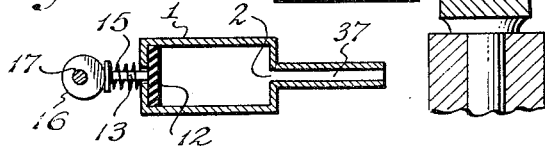
INVENTORS
C. A. MORENO
B. BERKOWITZ
J. E. MELVILLE
BY
Paul B. Hunter
ATTORNEY

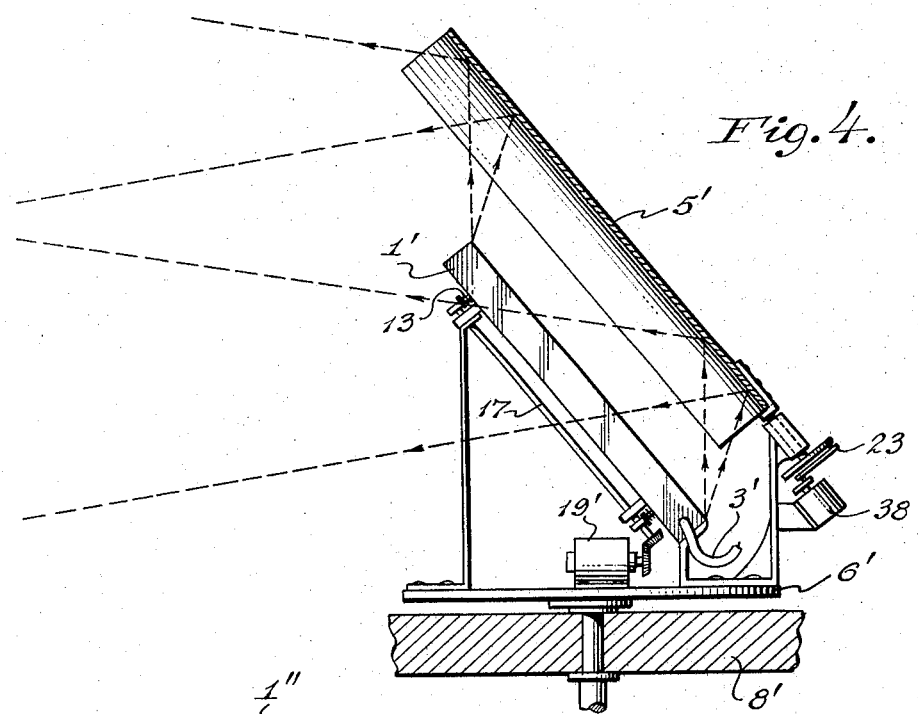
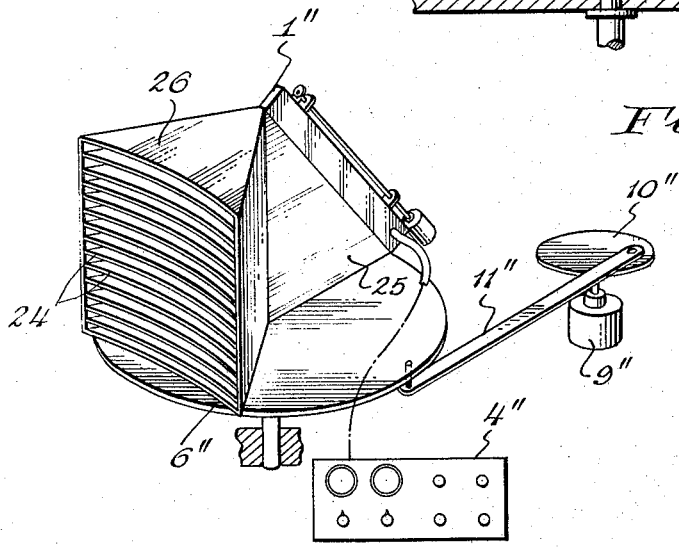
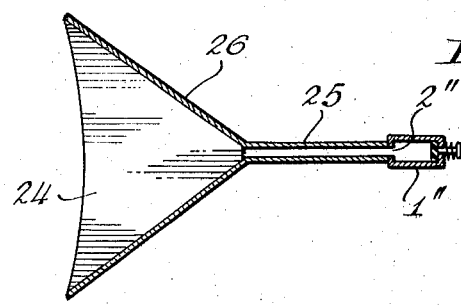

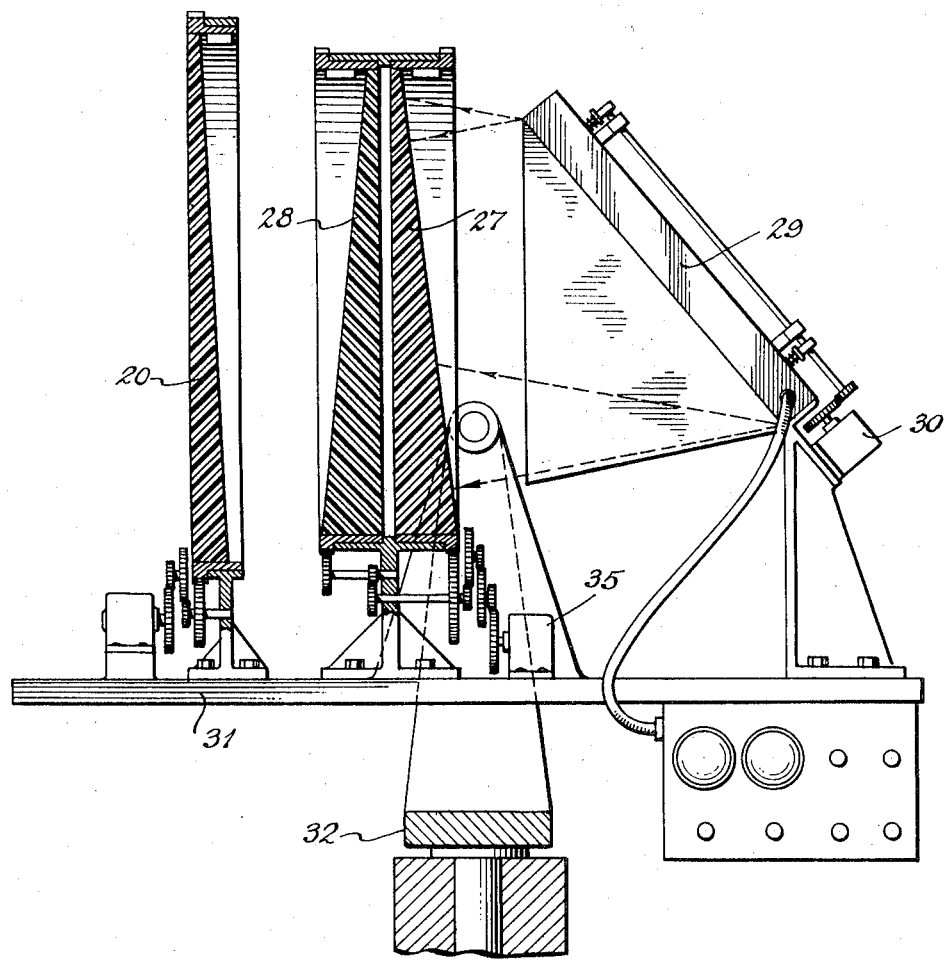

United States Patent Office 3,242,496
Patented Mar. 22, 1966

3,242,496
SCANNING ANTENNA SYSTEM
Charles A. Moreno, Franklin Square, Bernard Berkowitz, Jamaica, and John E. Melville, New York, N.Y., assignors to Sperry Rand Corporation, a corporation of Delaware
Filed Aug. 6, 1948, Ser. No. 42,945
2 Claims. (Cl. 343—754)

This invention relates generally to scanning antenna systems and the invention has reference, more particularly, to a rapid search and track scanning antenna system employing a leaky wave guide to produce line scanning in one plane, line scanning in a plane at right angles to the first-mentioned plane being obtained through use of a movable reflector or other means.

Directive antenna scanner systems have been developed heretofore for use in connection with various types of radar equipment for the purpose of locating and determining the position of targets or objects, and the distances thereto. Generally such directive antenna systems have been of the mechanical type wherein motor driven units are employed for actuating a parabolic or other reflector at a regular angular rate of speed to effect scanning or the antenna and/or the electromagnetic feed supplying the scanner is actuated mechanically. These prior art devices have been objectionable in that considerable vibration often results in the use of such devices due to the rapid reversal of direction of motion of the same in use.

It is one purpose of the present invention to provide a novel scanning antenna system wherein a search scan is attained over a desired solid angle, for example, an angle of 50° in azimuth by 20° in elevation, which space is searched rapidly at the rate of approximately once per second. This rapid search requires apparatus which preferably utilizes electrical scan along one line and another, such as mechanical scan, along another line at right angles to the first line, the apparatus being so constructed and arranged that scanning is obtained without undue vibration while maintaining the desired range and power requirements.

One object of the present invention is to provide a novel scanning system employing a leaky wave guide with means for varying the phase velocity of the energy within the guide to thereby effect scan along one line, the said scanning system employing a means for either moving said wave guide at right angles to the first line of scan to effect scanning along a line at right angles to the first line, as by either employing movable reflector means or movable lens means for effecting scan along the second line.

Another object of the present invention is to provide a novel scanning system for effecting limited search scan and tracking scan thereafter with a rapid changeover from one scan to the other.

Other objects and advantages will become apparent when taken in connection with the drawings, of which FIG. 1 is a perspective view of an apparatus embodying the present invention for effecting search scan of a desired solid angle;

FIG. 2 is an enlarged part sectional view of the structure shown in FIG. 1 and also shows the means for obtaining tracking;

FIG. 3 is a cross section of the leaky wave guide shown in FIGS. 1 and 2;

FIG. 4 is an elevational part sectional view of a somewhat modified structure;

FIG. 5 is a perspective view of a further modified structure;

FIG. 6 is a fragmentary sectional view of the structure shown in FIG. 5; and

FIG. 7 illustrates a modified structure using a leaky wave guide in combination with a pair of dielectric wedges for effecting a line scan at right angles with each other together with a dielectric lens for obtaining tracking.

Referring now to FIG. 1 there is shown a leaky wave guide 1 which is provided with a longitudinally extending radiating slot 2, which slot may take the form of a series of apertures if desired, (see particularly FIG. 3) and which wave guide is energized through a concentric line or other energy conveying means 3 from a suitable high frequency transmitter 4. The wave guide is positioned at an inclined angle with respect to a parabolic cylindrical reflector 5. The radiating slot 2 of guide 1 communicates with a hollow conductor 37 consisting of spaced parallel plates extending toward the reflector 5 and terminating in a mouth extending along a line located approximately at the focus of this reflector.

Reflector 5 together with the wave guide 1 is mounted upon an oscillatory platform 6. The platform 6 is shown provided with a depending central trunnion 7 having a bearing in a pedestal 8. The platform 6 is adapted to be oscillated through any desired angle such as a 50° angle by means of a motor 9 acting through a bell crank disc 10 and link 11 connected to the platform 6. When high-frequency electromagnetic energy is fed from the conductor 3 into the wave guide 1, it travels within the guide and such energy is emitted through the slot or longitudinal series of slots 2 via conductor 37 to the focus of the reflector for emission toward the reflector. The direction of propagation of the radiated waves in free space forms an angle with the direction of propagation in the hollow wave guide whose cosine is the ratio of the phase velocity of the waves in free space to that of the phase velocity of the waves in the guide.

Since the phase velocity of propagation in free space is constant, the direction of free space propagation necessarily shifts according to this cosine law relating to phase velocities and directions or propagation within and without the radiation guide.

When the wave guide is positioned as shown in FIGS. 1 and 2, the energy therefrom spills upon the reflector 5 and is reflected forwardly thereof into space. In order to effect a line scan of such energy, it becomes necessary to either change the phase velocity of the energy within the guide 1 at a regular rate to thereby correspondingly vary the direction of the wave energy in free space, or to vary the frequency of oscillation of the electromagnetic energy. In the apparatus shown in FIGS. 1 and 2, the phase velocity of the electromagnetic energy within the guide is varied regularly by means of a moving dielectric or conducting member 12 shown in the form of a flat plate extending longitudinally within the guide 1 and being provided with rod supports 13 projecting outwardly through apertures in the guide 1. These rod supports are urged outwardly by coil springs 15 and adapted to be moved inwardly by means of cams 16 carried by a shaft 17, which shaft is shown connected through gearing 18 to a drive motor 19, which is preferably of the constant speed type.

As more fully explained in copending application Serial No. 495,101 of Wm. H. Ratliff, Jr., filed July 17, 1943, now Patent No. 2,602,893, movement of dielectric member 12 within the guide serves to vary the effective dimensions and the phase velocity of the electromagnetic energy within the guide. Thus, as the motor 19 operates, it effects reciprocation of the member 12 within the guide and thus varying the phase velocity of the energy within the guide, and varying the value of the emission angle $\theta$ so that radiation pattern of the beam of radiant energy is caused to scan between two limits—the amount of scan being determined by the overall phase shift of the travelling waves within the guide.

This could also be accomplished by varying the frequency of the transmitter 4, in which case the amount of swing of the beam effecting lineal scan would be determined by the frequency swing of the energy. It is entirely practical to obtain a 20° line scan in the manner shown in FIGS. 1 and 2, this scanning, as illustrated, being in the vertical plane.

To effect a desired line scan in the horizontal plane, the motor 9 is operated preferably at a constant speed so as to oscillate the platform 6, thereby oscillating the reflector 5 and wave guide 1. For example, should it be desired to scan through an azimuthal angle of 50°, the bell crank disc and lever mechanism 10 and 11 will be so proportioned as to effect a 50° swing of the platform 6. The apparatus as thus described is suitable for search scan.

To obtain tracking, the mechanism shown in FIGS. 1 and 2 is arrested at a point in the search cycle when such apparatus is directed toward a desired target and then a single wedge lens prism 20 is rotated as by a motor 21 acting through gearing 22 to effect conical tracking scan. The lens prism 20 is of the type disclosed in application Serial No. 17,192 of Robert V. Gould, filed March 26, 1948, now U.S. Patent No. 3,226,721.

It is to be understood that while the apparatus has been explained as using the electrical scanning produced by varying the phase velocity in the wave guide for obtaining a 20° angle and using the oscillating reflector for obtaining a 50° angle, it is to be understood that these values could be reversed if desired and the larger angle obtained from the electrical scan.

Another form of the invention is shown in FIG. 4 and is somewhat similar to that shown in FIGS. 1 to 3 except that both the wave guide 1' and the reflector 5' are inclined to the vertical, and the reflector alone oscillates. In this figure, the platform 6' is shown stationary while the reflector 5' is oscillated through suitable gearing and linkage 23 from the motor 38. A separate motor 19' is used for changing the phase velocity within the guide. Other parts of FIG. 4 are similar to the preceding figures. The platform 6' may be turned angularly as when performing track scan.

In the form of invention shown in FIGS. 1 to 3, the reflector 5 alone may be oscillated, if desired, as in the case of the structure of FIG. 4, thereby reducing inertia effects inasmuch as the platform 6 and guide 1 are stationary.

In the structure shown in FIGS. 5 and 6, a thick metal or dielectric lens 24 is employed for focusing the beam supplied from the leaky wave guide 1". It will be noted that the slot 2" in the mouth of this guide feeds through a hollow conductor 25 into a tapered horn portion 26 at the mouth of which is located the lens plates 24, which lens plates serve to form a beam for use in obtaining azimuthal scanning.

To effect azimuthal scan, the apparatus is mounted on the platform 6" and is oscillated through a desired angle by means of a motor 9" and bell crank disc 10" and link 11". Here again, if it is desired to obtain tracking, the same is accomplished by use of the rotating prism 20 as illustrated in FIG. 2 of the drawings.

If it is desired to eliminate the use of an oscillatory reflector such as 5, azimuthal scan may be obtained through use of a pair of wedge lenses 27 and 28 as shown in FIG. 7 of the drawings. In this figure, the leaky wave guide 29 directs its energy toward wedge lenses 27 and 28, which rotate in opposite directions in the manner described in the aforementioned patent application Serial No. 17,192, now U.S. Patent No. 3,226,721. Line scan in elevation is thus obtained by the changing phase velocity within wave guide 29 produced by operation of a motor 30 moving a dielectric member within the guide 29 as explained in connection with the previous figures, and scan in the azimuthal plane is obtained through the use of the wedge lenses 27 and 28 shown driven from the motor 35 through suitable gearing.

As before, to obtain conical tracking scan, a wedge lens 20 is used, all of this apparatus being shown as mounted upon the platform 31 which is universally adjustable by the means 32 so that the same may be pointed in any desired direction.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A scanning antenna structure comprising an inclined leaky wave guide having a longitudinal slot along the length thereof, a vertical parabolic cylindrical reflector positioned adjacent said leaky wave guide, a hollow wave guide member connected for feeding energy from said leaky wave guide to the focal line of said reflector, a dielectric member positioned within said leaky wave guide, means for regularly moving said dielectric member to vary the rate of propagation of electromagnetic energy within said guide to thereby vary the angle of directivity of energy leaving said wave guide member to effect line scan in one direction, and means for bodily oscillating said reflector together with said wave guide to effect line scan at right angles to said initial line scan, thereby producing a raster search scan extending through a desired solid angle.

2. A scanning antenna system as defined in claim 1, wherein a dielectric wedge lens member is positioned in front of said wave guide and said reflector, and motor means for rotating said wedge lens member to effect a conical tracking scan of the beam of electromagnetic energy reflected from said reflector.

References Cited by the Examiner

UNITED STATES PATENTS

| | | | |
|---|---|---|---|
| 2,408,435 | 10/1946 | Mason | 250—33.63 |
| 2,419,024 | 4/1947 | Iams. | |
| 2,419,205 | 4/1947 | Feldman | 250—33.63 |
| 2,422,579 | 6/1947 | McClellan | 250—33.65 |
| 2,423,150 | 7/1947 | Lindenblad | 250—33 X |
| 2,429,601 | 10/1947 | Biskeborn et al. | 250—33.63 |
| 2,432,990 | 12/1947 | Hansen | 250—33.63 |
| 2,433,368 | 12/1947 | Johnson et al. | 250—33.63 |
| 2,434,253 | 1/1948 | Beck | 250—33.63 |
| 2,435,988 | 2/1948 | Varian | 250—33.63 |
| 2,436,380 | 2/1948 | Cutler | 250—33.63 |
| 2,442,951 | 6/1948 | Iams | 250—33.63 |
| 2,453,414 | 11/1948 | De Vore | 250—33.63 |
| 2,455,094 | 11/1948 | Samuel | 250—33.63 X |
| 2,480,143 | 8/1949 | Lanxner | 250—33.65 |

ELI LIEBERMAN, *Acting Primary Examiner.*

MELVIN H. FRIEDMAN, SIMON YAFFEE, NORMAN H. EVANS, *Examiners.*